(12) United States Patent
Vawter (10) Patent No.: US 7,708,194 B2
(45) Date of Patent: May 4, 2010

(54) VIRTUAL WALLET

(75) Inventor: Jamison Vawter, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 885 days.

(21) Appl. No.: 11/466,544

(22) Filed: Aug. 23, 2006

(65) Prior Publication Data
US 2008/0048022 A1 Feb. 28, 2008

(51) Int. Cl.
*G06K 5/00* (2006.01)
(52) U.S. Cl. .................................. 235/380; 235/382
(58) Field of Classification Search .................. 235/379, 235/380, 382, 383; 705/51, 57, 64, 44
See application file for complete search history.

(56) References Cited

U.S. PATENT DOCUMENTS

| | | | | |
|---|---|---|---|---|
| 5,221,838 A | * | 6/1993 | Gutman et al. | 235/379 |
| 5,521,362 A | * | 5/1996 | Powers | 235/380 |
| 7,107,247 B2 | * | 9/2006 | Kinoshita et al. | 705/64 |
| 2001/0011256 A1 | * | 8/2001 | Hannula et al. | 705/79 |
| 2005/0187883 A1 | * | 8/2005 | Bishop et al. | 705/67 |

\* cited by examiner

*Primary Examiner*—Thien M Le (57) ABSTRACT

A managed service may include first logic to receive authentication information from a user terminal on behalf of a user, and receive user information on behalf of the user when the user terminal is authenticated via the authentication information. The first logic may send a portion of the user information to a mobile wallet application operating on a mobile terminal related to the user, and may receive updated user information from the mobile terminal, where the updated user information identifies a change to the portion of the user information, the change based on an operation performed via the mobile terminal on behalf of the user. The managed service may include second logic to store the user information in a server virtual wallet application on behalf of the user, retrieve the portion of the user information from the server virtual wallet application for the sending, and store the updated user information in the server virtual wallet application.

20 Claims, 9 Drawing Sheets

VIRTUAL WALLET

BACKGROUND OF THE INVENTION

A mobile device user may maintain certain information on his/her mobile device (e.g., a cell phone) and certain information in other locations, such as a wallet, purse, billfold, organizer, paper calendar, etc. The mobile device user may find it cumbersome to access the mobile device for certain information, e.g., phone numbers, call logs, etc., and the other locations for other information, such as a driver's license number, credit card number, coupon, etc. In addition, the mobile device user may not have his/her wallet, purse, billfold, organizer, paper calendar, etc., with him/her when carrying the wireless device. As a result, the mobile device user may not be able to participate in certain types of transactions, such as providing a driver's license number to establish his/her identity, without having to postpone the transaction while the mobile device user goes to retrieve the forgotten information from its location (e.g., the mobile device user's car, house, office, etc.).

Additionally, a user carrying sensitive information, such as that on a credit card or driver's license, lives with the possibility that if the card/license is misplaced or stolen, the information is immediately available to anyone coming in possession of the card/license.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF PREFERRED EMBODIMENTS

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may allow a user to establish a virtual wallet. The virtual wallet may include user information, such as information that a user may keep in a conventional wallet (e.g., a billfold). For example, the virtual wallet may store electronic representations of driver's license information for the user, bank account information, credit card information, automated teller machine (ATM) card information, medical information, contacts, coupons, electronic keys (e.g., house keys or car keys), etc. The virtual wallet may further store other types of information, such as call logs, electronic receipts, directions, shopping lists, documents, data files, music files, etc.

The user may access information in the virtual wallet for use in transactions, such as purchase transactions. For example, a user may carry a mobile terminal that includes a virtual wallet (e.g., a virtual wallet implemented via a plug-in module). The user may make a purchase using information retrieved from the virtual wallet, such as a shopping list, credit card information, coupons, etc. The user may send retrieved information to a cash register involved in the purchase transaction via a near field or far field wireless link (e.g., a near field Bluetooth link). The register may send a receipt to the mobile terminal via the wireless link and the mobile terminal may store the receipt in the virtual wallet.

The mobile terminal may send a copy of the receipt to a server so that the server can store the receipt in a virtual wallet account maintained on behalf of the user. In an implementation, a mobile terminal may store frequently used information in a virtual wallet on the mobile device, while other information related to a user of the mobile terminal is stored on a server. The server may run a virtual wallet application that allows one or more users to access, configure, update, etc. his/her virtual wallet information. For example, a user may log into the server via web browser and may upload photos into his/her virtual wallet account. The user may instruct the server to send certain photos to a mobile terminal operated by the user. The certain photos may be stored on the mobile terminal via a virtual wallet application operating on the mobile terminal.

As used herein, "transaction" may refer to an exchange of information between two parties, such as a mobile terminal and a destination device. A transaction may include a purchase, an exchange, a credit, request for services, request for information, and/or any other type of information exchange. In one implementation, a transaction may include an exchange of monetary information (e.g., electronic money, credit card information, ATM card information, etc.). Other types of transactions may include exchanges of other information types.

Implementations of mobile wallets as described herein may be incorporated into devices and/or systems, such as those described in patent application entitled "Multi-Function Transaction Device" Ser. No. 11/465,271 filed on Aug. 17, 2006; in patent application entitled "Party Identification In A Wireless Network" Ser. No. 11/466,215 filed on Aug. 22, 2006; in patent application entitled "Secure Near Field Transaction" Ser. No. 11/465,935 filed on Aug. 22, 2006; and in patent application entitled "Transaction Information Mining" Ser. No. 11/463,326 filed on Aug. 9, 2006, the content of the above applications are incorporated herein by reference in their entireties, respectively.

Figure 1:
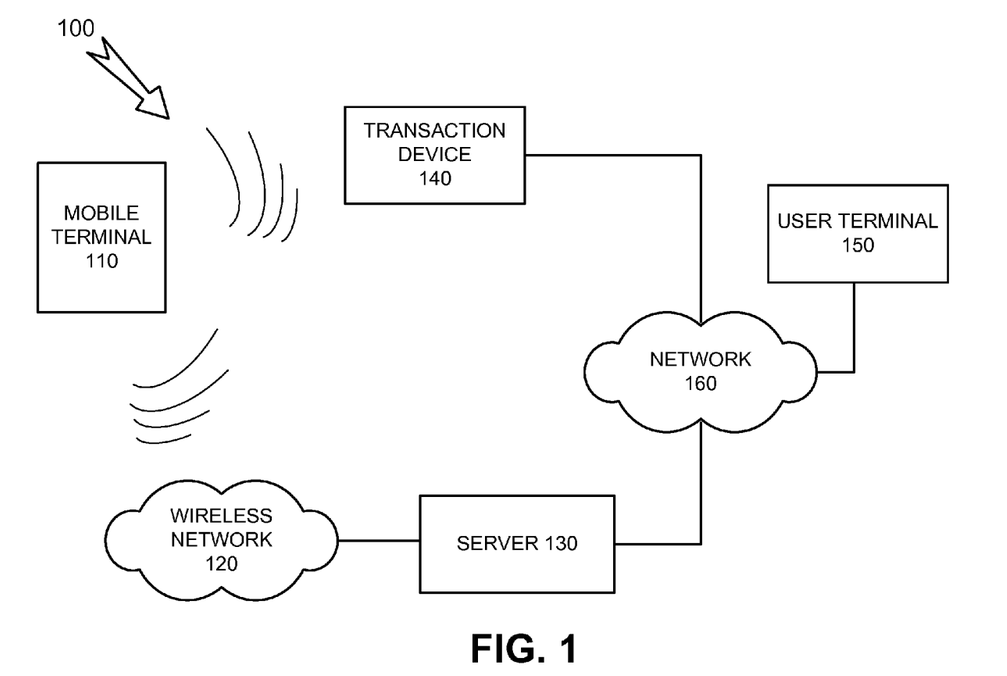
FIG. 1 illustrates an exemplary system that can be configured to operate in accordance with principles of the invention.

FIG. 1 illustrates an exemplary system 100 that can be configured to operate in accordance with principles of the invention. System 100 may include a mobile terminal 110 (hereinafter terminal 110), a wireless network 120, a server 130, a transaction device 140, a user terminal 150, and a network 160.

Terminal 110 may include a device that exchanges information with a destination. For example, terminal 110 may include a handheld device, such as a web-enabled cellular telephone, an Internet protocol (IP) telephone, a personal digital assistant (PDA), a computer, such as a laptop computer, a plain old telephone system (POTS) device, etc. Other implementations of terminal 110 may include other devices, such as a server and/or another computation or communication device. In one implementation, terminal 110 may communicate via packet based or non-packet based wireless transmissions.

In an implementation, terminal 110 may include hardware or software based logic to maintain a virtual wallet on behalf of a user of terminal 110. As used herein, "virtual wallet" refers to information related to a user of terminal 110 and/or to hardware or software used in terminal 110. For example, a virtual wallet may be implemented in a portion of memory and may store user information that includes identification information related to the user (e.g., driver's license information), financial information for the user (e.g., bank account information), records (e.g., receipts, contact lists, to-do lists, etc.), applications (e.g., applications that allow terminal 110 to perform transactions), images, music files, electronic money, electronic keys, etc. In one implementation, a virtual wallet may include electronic implementations of items that a user might carry in his/her conventional wallet (e.g., a driver's license, passport, credit card, etc.). Other implementations of a virtual wallet may include other types of information, e.g., spreadsheets, data files, etc.

Terminal 110 may further include hardware or software based logic to establish a secure communication session with a destination, such as server 130 and/or transaction device 140 via wireless network 120. Terminal 110 may be adapted to perform near field wireless communication, e.g., communication over a distance of several inches to a few feet, and/or far field communication, e.g., communication over substantially any distance. Terminal 110 may be configured to store information about one or more transactions in the virtual wallet or in another type of memory and/or may send and/or receive transaction information to/from another device, such as server 130 and/or transaction device 140. For example, terminal 110 may store information about a purchase transaction (e.g., an electronic receipt) in the virtual wallet on terminal 110. Terminal 110 may further send a copy of the receipt to server 130, where server 130 may store the information on behalf of terminal 110 in a virtual wallet operating on server 130.

Wireless network 120 may include a network that transfers information. Implementations of wireless network 120 may include cellular networks and/or other types of wireless networks, such as ad hoc wireless networks, free-space optical networks, etc. Wireless network 120 may send and/or receive information via packet-based or non-packet based exchanges. In one implementation, wireless network 120 may be operated by a service provider that provides wireless communication services to a customer, such as a user of terminal 110, as a managed service (e.g., for a monthly fee). Wireless network 120 may send and/or receive encrypted information and/or unencrypted information.

Server 130 may include a device that receives information from, or transmits information to, another device and/or network. For example, server 130 may include a workstation, desktop computer, laptop computer, PDA, web enabled cellular telephone, Wi-Fi device, or another type of network device. Server 130 may run applications, such as server applications, virtual wallet applications, authentication and/or authorization applications, database applications, email applications, reporting applications, communication applications (e.g., wireless communication applications), e-commerce applications, etc.

In one implementation, server 130 may provide a service, such as a managed service, to other devices in system 100, such as terminal 110 and/or user terminal 150. For example, server 130 may provide communication services, virtual wallet services, transaction storage services, etc., to terminal 110 as managed services, e.g., services provided on a monthly subscription basis. For example, server 130 may operate a virtual wallet application that provides storage of user information in the virtual wallet application on behalf of terminal 110. The managed service may further allow a user of terminal 110 to access and/or configure his/her account and/or upload/download information into his/her account.

Transaction device 140 may include a device that performs a transaction on behalf of a customer or device. For example, transaction device 140 may include a cash register operated by a retailer, a transaction server operated by a web-based retailer, a computer (e.g., a server) operated by a government agency (e.g., a department of motor vehicles), a computer operated by a hospital, an application specific computer (e.g., a computer that operates an access gate or door to a structure), etc.

Transaction device 140 may communicate with terminal 110 via a secure near field wireless link while performing a transaction on behalf of terminal 110. Transaction device 140 may further communicate with another device, such as server 130, regarding the transaction, such as by sending transaction details to server 130 via network 160. In one implementation, transaction device 140 may configure a tunnel to allow terminal 110 to access a destination (e.g., server 130) via a secure link.

User terminal 150 may include a device that sends information to or receives information from server 130 or terminal 110. For example, user terminal 150 may include a desktop computer, laptop computer, PDA, web enabled cellular telephone, Wi-Fi device, or another type of network device. In other implementations, user terminal 150 may take other forms.

In one implementation, user terminal 150 may be used to configure a virtual wallet account on server 130 on behalf of terminal 110. User terminal 150 may further load user information into an information storage location in a virtual wallet account on server 130 on behalf of terminal 110 or a user of terminal 110. Terminal 110 and/or other devices operated on behalf of the user may have access to information in the virtual wallet account, such as user information that can identify terminal 110 with respect to other devices in system 100.

Network 160 may include any network that transfers information. Implementations of network 160 may include public switched telephone networks (PSTNs), local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), etc.

Network 160 may include network devices, such as routers, switches, firewalls, gateways, and/or servers (not shown). Network 160 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Figure 2:
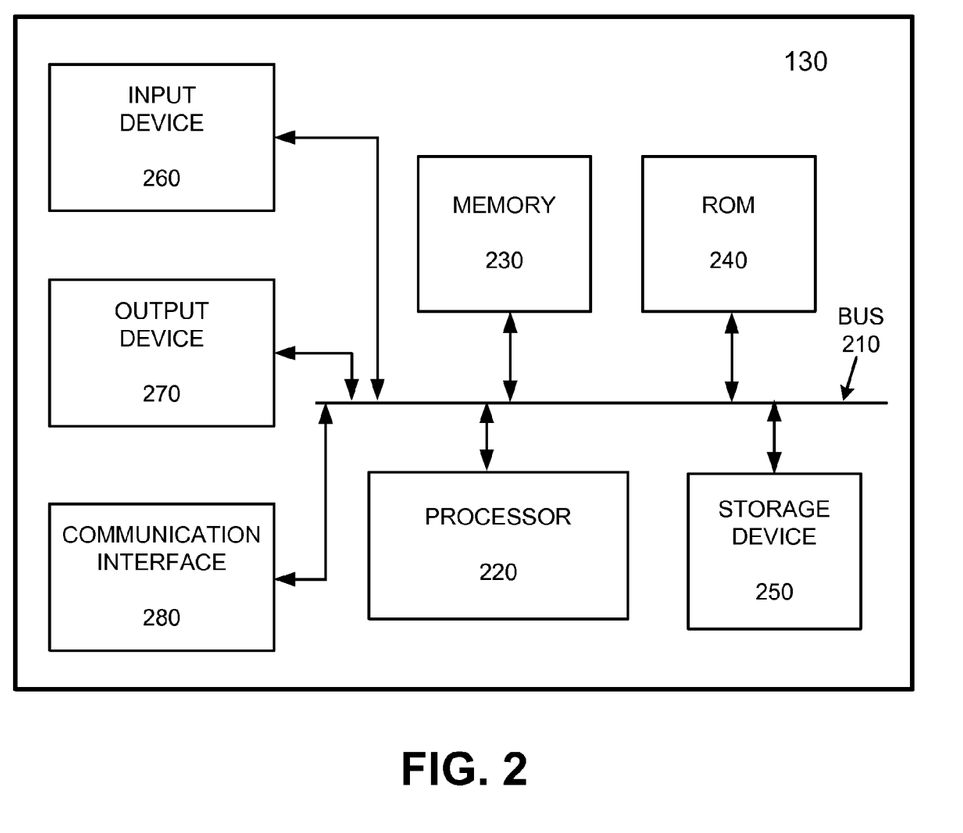
FIG. 2 illustrates an exemplary architecture for implementing the server of FIG. 1.

FIG. 2 illustrates an exemplary architecture for implementing server 130. It will be appreciated that terminal 110, transaction device 140, user terminal 150, and/or other devices (not shown) that can be used in system 100 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as terminal 110, transaction device 140, enterprise 150, and/or third party 170. For example, communication interface 280 may include a modem, an Ethernet interface, a wireless interface, and/or a port. Alternatively, communication interface 280 may include other mechanisms for communicating via a network, such as network 160.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Figure 3:
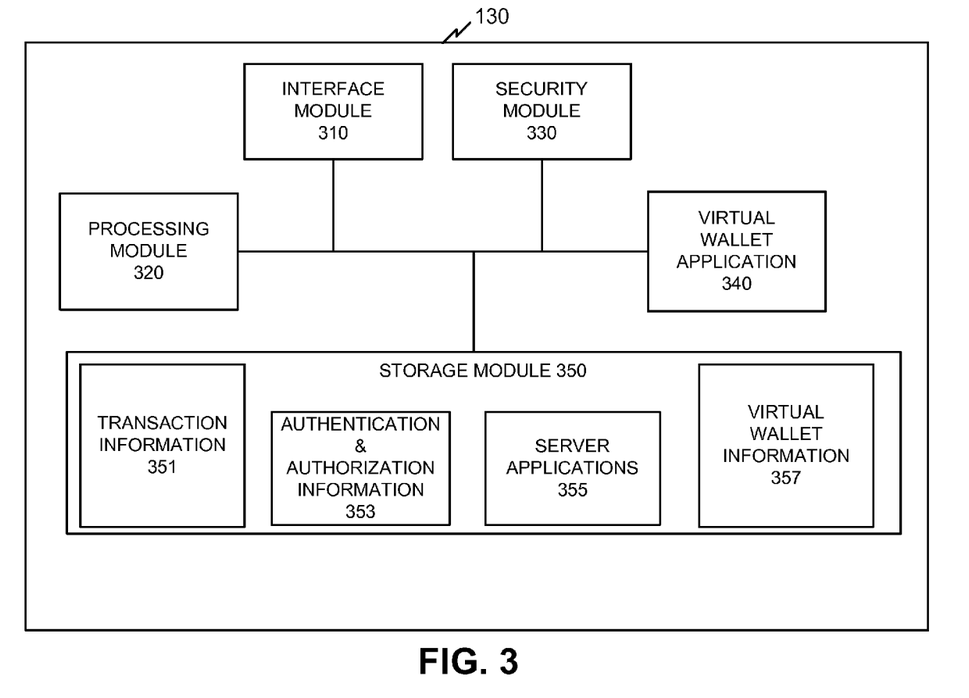
FIG. 3 illustrates an exemplary functional diagram of the server of FIG. 1.

FIG. 3 illustrates an exemplary functional diagram of server 130. Server 130 may implement hardware or software based logic to operate as a managed service provisioning device, an authorization device, a remote storage device, etc. Implementations of server 130 may operate on behalf of devices on wireless network 120 or network 160, such as terminal 110, transaction device 140, or user terminal 150.

An implementation of server 130 may include an interface module 310, a processing module 320, security module 330, a virtual wallet application 340, and a storage module 350.

Interface module 310 may include hardware or software based logic to send and/or receive information. For example, interface module may include first logic (e.g., a mobile terminal interface) to exchange information with terminal 110. The mobile terminal interface may include a transceiver that sends and receives wireless data to/from terminal 110 via wireless network 120. The mobile terminal interface may be adapted to send and receive encrypted information and/or un-encrypted information.

Interface module 310 may include second logic to exchange information with user terminal 150. For example, interface module 310 may include a user terminal interface that allows user terminal 150 to perform secure information exchanges with server 130 via a WAN. Interface module 310 may include other logic to allow server 130 to communicate with other devices in system 100, such as transaction device 140.

Processing module 320 may include hardware or software based logic to process instructions related to providing services to terminal 110 or user terminal 150, exchanging information with devices in system 100, processing data related to the configuration and operation of virtual wallet accounts on behalf of users, processing data related to transactions (e.g., processing information in a receipt received from transaction device 140), etc. Processing module 320 may be implemented in a standalone or distributed configuration, such as by being distributed across one or more devices.

Security module 330 may include hardware or software based logic to identify a user of terminal 110, user terminal 150, or a user of another device in system 100, to identify a device in system 100, and/or to determine whether a user/device is authorized to access a destination, participate in a communication session (e.g., interacting with a virtual wallet account and/or performing a financial transaction), and/or receive information (e.g., virtual wallet information stored on server 130).

Security module 330 may generate authorization mechanisms and/or may operate with authorization devices and/or mechanisms, such as password generators, pseudo-random number generators, passwords, tokens, biometric identifiers, secure identification (secure ID) values, and/or other identifiers to establish an identity of a user or device. For example, security module 330 may generate a token that allows terminal 110 to access another device.

Security module 330 may process authorization mechanisms received from a sending device to authenticate the sending device to another device in system 100. For example, security module 330 may receive a token from a device that received the token from terminal 110. Server 130 may process the token to determine whether terminal 110 is valid. Security module 330 may generate an authorization message and may send the authorization message to the device that received the token from terminal 110. The authorization message may identify whether an identity of terminal 110 has been validated.

In an implementation, security module 330 may include radio frequency identification (RFID) logic to allow devices in system 100 to perform validations and/or exchange information via RFID based techniques. For example, security module 330 may verify the identity of terminal 110 for transaction device 140 when transaction device 140 receives an RFID signal from terminal 110 that contains information identifying terminal 110.

In a second implementation, security module 330 may include logic to operate with secure ID based information. For example, security module 330 may issue secure ID tokens to devices, may process secure ID tokens received from devices, etc. Other implementations of security module 330 may be implemented in other ways. Implementations of security module 330 may operate with encrypted and/or unencrypted information when authorizing a user or device.

Virtual wallet application 340 may include hardware or software based logic to implement a virtual wallet for one or more users via server 130. In one implementation, virtual wallet application 340 may serve a number of users as a managed service. For example, each user may have a virtual wallet account whereby the user can store his/her user information and/or other information, such as information related to transactions and/or merchants. Virtual wallet application 340 may communicate with a virtual wallet application operating on mobile terminal 110 (e.g., a mobile virtual wallet application) and/or another device. For example, virtual wallet application 340 can mirror some or all of its information to the other device. Virtual wallet application 340 may store user information and/or other information as virtual wallet information 357.

Storage module 350 may include hardware or software based logic to store information related to users or devices operated by users or on behalf of users. Storage module 350 may also store user information, transaction information, payment information, account information, virtual wallet information, authentication information, etc. Storage module 350 may be implemented in server 130 and/or may be located remotely with respect to server 130 and connected thereto via a link. Storage module 350 may be implemented in memory 230, ROM 240 and/or storage device 250.

In one implementation, storage module 350 may include transaction information 351, authentication and authorization information 353, server applications 355, and virtual wallet 357. Transaction information 351 may include information related to a transaction, such as an exchange of information between two devices in system 100. For example, transaction information 351 may include information about authorized merchants (e.g., merchants that can participate in virtual wallet related transactions), items purchased, quantities of items purchased, sizes, shapes, and/or styles of items purchased, date/time information related to a transaction, a transaction identifier, a merchant identifier, a location identifier, etc. Transaction information 351 may be stored on behalf of terminal 110 and/or another device, such as transaction device 140. Transaction information 351 may include electronic receipts, information about coupons and/or other discounts related to terminal 110, etc. In one implementation, some or all of the information stored in transaction information 351 may be stored in virtual wallet information 357.

Authentication and authorization information 353 may include information related to the authentication, authorization, validation, and/or identification of a user and/or device (e.g., terminal 110, transaction device 140, user terminal 150, etc.) in system 100. Authentication and authorization information 355 may include a user name, password, personal identification number (PIN), token, secure ID value, electronic serial number (ESN), certificate, watermark, merchant identifier, transaction identifier, code (e.g., a script), etc. In one implementation, security module 330 may use authentication and authorization information 353 when performing security related functions on behalf of server 130. In an implementation, some or all of authentication and authorization information 353 can be stored in virtual wallet information 357.

Server applications 355 may include software applications residing on server 130. Server applications 355 may include communication applications, database applications, location tracking applications, accounting applications, etc. For example, storage module 350 may store code related to virtual wallet application 340, a web serving application, etc., in server applications 355.

Virtual wallet information 357 may include information related to virtual wallet application 340 operating on server 130. For example, virtual wallet information 357 may include identification information for a user of terminal 110 (e.g., a name, address, telephone number), financial information related to terminal 110, images and/or music files related to terminal 110, etc. Some or all of the contents of virtual wallet information 357 may be used in a virtual wallet operating on another device, such as terminal 110 or user terminal 150. Information stored in virtual wallet information 357 may be mirrored to and/or stored on other devices, such as terminal 110 or user terminal 150.

Figure 4:
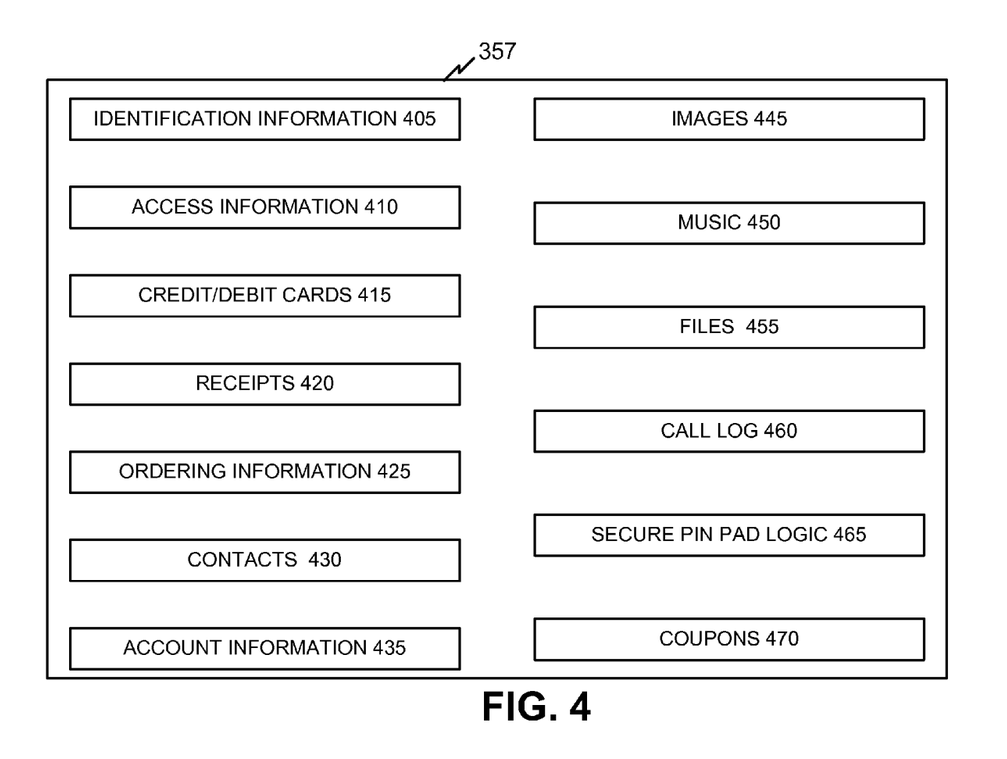
FIG. 4 illustrates an exemplary functional diagram for the virtual wallet information that can be stored on the server of FIGS. 1-3.

FIG. 4 illustrates an exemplary functional diagram of virtual wallet information 357 that can be used with virtual wallet application 340 on server 130. Virtual wallet information 357 may be stored on server 130, terminal 110, user terminal 150 and/or other devices in system 100. Virtual wallet information 357 may include identification information 405, access information 410, credit/debit cards 415, receipts 420, ordering information 425, contacts 430, account information 435, images 445, music 450, files 455, call log 460, secure personal identification number (PIN) pad 465 (hereinafter PIN logic 465), and coupons 470. Other implementations of virtual wallet information 357 may include other types of information.

Identification information 405 may include information that identifies a user, terminal 110, user terminal 150, etc. Identification information 405 may include a user's name, address, phone number, email address, etc. For example, identification information 405 may include automobile insurance policy information, automobile registration information, driver's license information, etc. Identification information 405 may further include information that identifies a device, such as an Internet protocol (IP) address, an Electronic Serial Number (ESN), a phone number, etc.

Access information 410 may include information that allows terminal 110 to access other devices. For example, access information may include passwords, secure ID values, tokens, electronic keys, etc. In one implementation, access information 410 may include an ESN, a token, and/or a PIN. Credit/debit cards 415 may include information related to credit cards, debit cards, etc., that are related to a user of terminal 110. For example, credit/debit cards 415 may include a credit card name, number, and expiration date.

Receipts 420 may include information about transactions performed by terminal 110. In one implementation, receipts 420 may include information associated with transaction information 351. Ordering information 425 may include information related to orders that can be placed via terminal 110. For example, a user of terminal 110 may configure a preferred menu for a fast food restaurant, where the preferred menu identifies items that the user frequently orders. Ordering information 425 may include a list of items on the preferred menu, contact information for the fast food restaurant, codes required to access an ordering application used by the fast food restaurant, and/or payment information (e.g., credit card number). As another example of ordering information 425, ordering information 425 may include a shopping list (e.g., a supermarket shopping list) that may have been previously entered, such as via a user terminal 150. When the user is at the store, the shopping list may be uploaded to the merchant to allow the merchant to fulfill the order.

Contacts 430 may include information related to persons or devices. Implementations of contacts 430 may include an address book, such as names, addresses, phone numbers, email addresses, etc., for persons that a user of terminal 110 may wish to contact. Other implementations of contacts 430 may include other types of information. Account information 435 may include information related to accounts that are associated with terminal 110 or a user of terminal 110. For example, account information may include account numbers for bank accounts, investment accounts, etc., maintained on behalf of a user of terminal 110.

Images 445 may include information related to still images, videos, etc. Music 450 may include information related to music files stored on behalf of terminal 110. For example, music 450 may include MP3 files, and/or other file formats that store music. Files 455 may include information related to files stored on behalf of terminal 110, such as data files, spreadsheets, documents, etc.

Call log 460 may include information about incoming and/or outgoing calls, missed calls, etc., related to terminal 110. PIN logic 465 may include logic that allows a user of terminal 110 to enter PINs to facilitate a transaction or to access protected information. For example, PIN logic 465 may include code that launches a secure PIN pad entry application that allows a user of terminal 110 to enter digits, letters, or symbols to establish his/her identity to another device. Coupons 470 may include information related to electronic coupons. For example, coupons 470 may include information that allows terminal 110 to receive a discount on goods or services when the coupon information is sent to transaction device 140 during a transaction.

The contents of virtual wallet information 357 may be stored on server 130 via memory 230, ROM 240 or storage device 250. Storage devices used to store virtual wallet information 357 may be local with respect to server 130 or may be remote with respect to server 130, e.g., networked storage devices related to server 130. In one implementation, terminal 110 may store portions of virtual wallet information 357 and/or may send information to server 130 that is used to update virtual wallet information 357.

Figure 5:
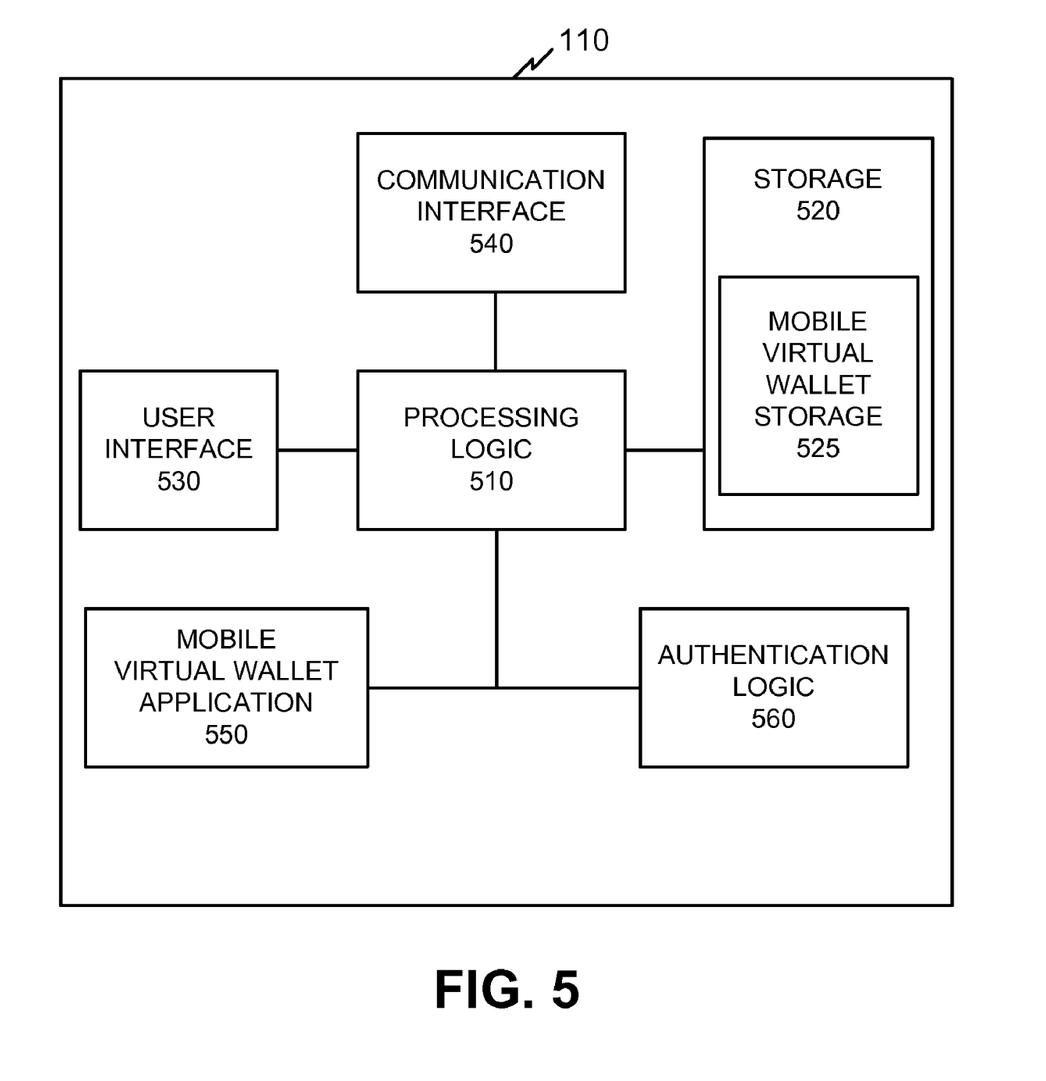
FIG. 5 illustrates an exemplary functional diagram of the mobile terminal of FIG. 1.

FIG. 5 illustrates an exemplary functional diagram of terminal 110. An implementation of terminal 110 may include processing logic 510, storage 520, user interface 530, communication interface 540, mobile virtual wallet application 550 (hereinafter mobile wallet 550), and authentication logic 560.

Processing logic 510 may include hardware or software to process instructions related to operating terminal 110. For example, processing logic 510 may include logic to allow terminal 110 to configure and/or access virtual wallet application 340 on server 130. In another implementation, processing logic 510 may process instructions to allow terminal 110 to receive a token from server 130, to establish a secure communication session with transaction device 140, to participate in a transaction with transaction device 140, and/or to establish communication sessions with other devices in system 100. Other implementations of processing logic 510 may perform still other functions. Processing logic 510 may be implemented in a standalone or distributed configuration, such as by being distributed across one or more devices.

Storage 520 may include hardware or software based logic to store information related to virtual wallets, transactions involving information stored in a virtual wallet, etc. Storage 520 may be implemented locally in terminal 110 and/or may be located remotely with respect to terminal 110 and connected thereto via a link, e.g., when server 130 provides remote storage capabilities to terminal 110. Storage 520 may include a mobile virtual wallet storage 525 (hereinafter mobile storage 525). Mobile storage 525 may include a portion of the contents of virtual wallet information 457. For example, a user may desire to maintain credit/debit cards information 415 on mobile terminal 110 since the user may routinely make purchases with his/her credit or debit cards. Mobile storage 525 may be updated via information received from a user, server 130, and/or another device.

User interface 530 may include hardware or software based logic that allows a user to interact with terminal 110. User interface 530 may include a keypad or other input device, a display, a speaker, a microphone, a tactile actuator (e.g., a vibrating device), control keys, etc. In one implementation, user interface 530 may operate with PIN logic 465 to allow a user of terminal 110 to enter a PIN to facilitate a transaction and/or to access protected information.

Communication interface 540 may include hardware or software based logic that allows terminal 110 to communicate with other devices. Implementations of communication interface 540 may include an antenna, a transmitter that may convert baseband signals from processing logic 510 to radio frequency (RF) signals and/or a receiver that may convert RF signals from the antenna to baseband signals. Alternatively, communication interface 540 may include a transceiver that performs the functions of both a transmitter and a receiver. Communication interface 540 may operate with other components, such as processing logic 510, user interface 530 (e.g., a display device) and/or authentication logic 560 when establishing a communication session on behalf of terminal 110.

Communication interface 540 may include near field communication logic that allows terminal 110 to participate in communication sessions over short distances, such as distances up to several feet (e.g., on the order of 30 feet) and far field communication logic that allows terminal 110 to participate in communication sessions over substantially any distance (e.g., communicating with a cell tower that is located several miles away from terminal 110 and/or communicating with a satellite). For example, terminal 110 may receive a query from a radio frequency identification (RFID) transmitter on transaction device 140. Terminal 110 may process the query and communication interface 540 may send information, such as a token that identifies terminal 110, to transaction device 140 via a secure near field communication signal. Terminal 110 may exchange other types of information with server 130 via a far field communication signal. Communication interface 540 may be adapted to send and/or receive communication signals via radio frequency (RF), free-space optical, and/or free-space acoustic waveforms.

Mobile wallet 550 may include hardware or software based logic to run a mobile wallet application on terminal 110 or another device (e.g., user terminal 150). In one implementation, mobile wallet 550 may exchange information with wallet storage 525. For example, mobile wallet 550 may retrieve credit card information from wallet storage 525 so that terminal 110 can make a credit card purchase.

Mobile wallet 550 may operate with communication interface 540 to send user information to virtual wallet application 340. For example, mobile wallet 550 may send information to virtual wallet application 340 when terminal 110 is updating information stored in virtual wallet information 357. Mobile wallet 550 may include transaction logic to allow terminal 110 to participate in transactions, such as secure near field purchase transactions with transaction device 140.

Authentication logic 560 may include hardware or software based logic that allows terminal 110 to establish its identity with another device. Authentication logic 560 may include logic that allows terminal 110 to generate a token, such as a string of digits that can be used to identify terminal 110 with respect to other devices in system 100, such as transaction device 140. In one implementation, authentication logic 560 may employ a secure identification value (SIV) that may include an ESN, a secure ID token (e.g., a rolling code), and/or a PIN. Terminal 110 may provide the SIV in response to a query, such as an RFID query, to identify terminal 110 to the device sending the query. Authentication logic 560 may further allow a user of terminal 110 to enter information, such as a password, PIN, answer to a prompt, etc., to establish an identity of terminal 110. For example, authentication logic 560 may retrieve a local copy of PIN logic 465 from wallet storage 525. Authentication logic 560 may use PIN logic 465 to allow the user of terminal 110 to enter a PIN to identify terminal 110 to a destination device.

In one implementation of terminal 110, authentication logic 560 may include an RFID chip that includes an electronic serial number (ESN). The RFID chip may receive a query from an RFID transceiver (e.g., a reader and a transmitter) and may provide the ESN to transaction device 140 in response to the query, where the ESN uniquely identifies terminal 110.

In another implementation, authentication logic 560 may include a secure ID token that is synchronized with another device, such as server 130. Terminal 110 may provide the secure ID token to transaction device 140 in response to a request, and transaction device 140 may verify the token via the other device (e.g., server 130).

In still another implementation, authentication logic 560 may include an RFID scanner, or another type of scanner such as an NFC based scanner, to allow terminal 110 to participate in peer-to-peer secure communication sessions. For example, a peer-to-peer secure communication session may occur when terminal 110 exchanges transaction information with a wireless PDA operated by another user.

Other implementations of authentication logic 560 may be configured in other ways. For example, an implementation of authentication logic 560 can be adapted to authenticate other devices, such as devices that communicate with terminal 110.

Figure 6:
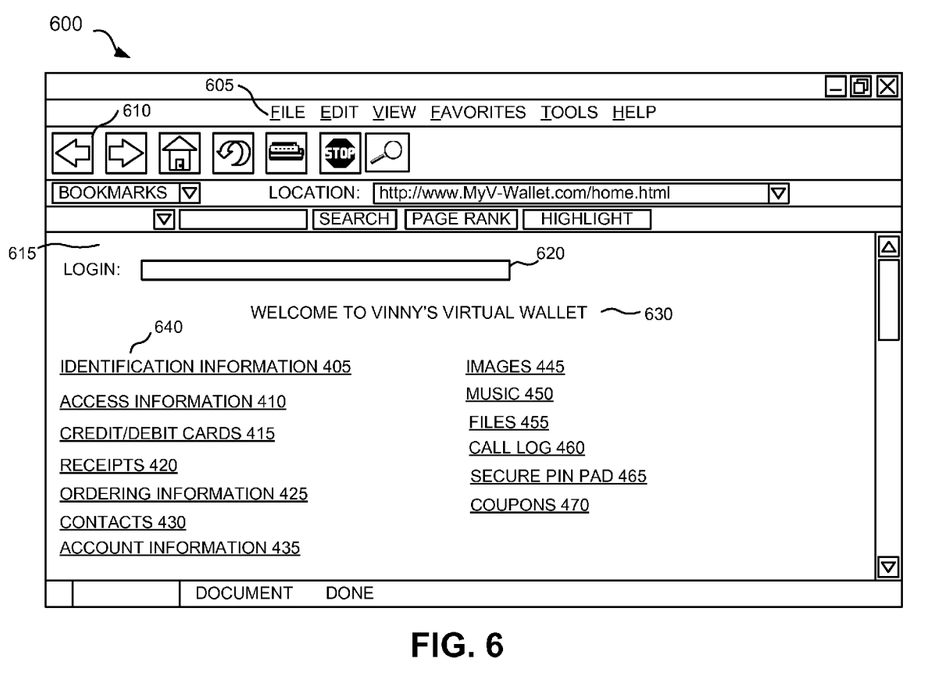
FIG. 6 illustrates an exemplary user interface that can access a user account on the server of FIG. 1.

FIG. 6 illustrates an exemplary user interface that can be used to access server 130. A user of terminal 110 may interact with user interface 600 to configure virtual wallet application 340 and/or to access information related to virtual wallet application 340, such as information maintained on behalf of a user using virtual wallet information 357. The user may access user interface 600 via terminal 110, user terminal 150, or another device.

Interface 600 may include information related to a virtual wallet account maintained on behalf of a user. For example, interface 600 may include drop down menus 605, shortcuts 610, window 615, login window 620, banner 630, and virtual wallet listings 640 (hereinafter listings 640). Drop down menus 605 may include links to commonly used functions, such as a file saving command, a copy command, a screen refresh command, etc. Shortcuts 610 may include radio buttons that perform operations on behalf of a user, such as displaying information from a previous browser page, scrolling to a browser page, printing, stopping a page refresh or download operation, etc.

Window 615 may include a display area to display information related to virtual wallet application 340, such as listings 640. Login window 620 may allow a user to enter information related to accessing virtual wallet application 340 running on server 130. A user may enter a user name and/or password in login window 620. Login window 620 may also accept other types of identification information, such as biometric identifiers, secure ID tokens, etc. Validated users may be allowed to access virtual wallet listings 640.

Banner 630 may include information related to a user of terminal 110, terminal 110, server 130, and/or other people, devices, etc. For example, banner 630 may include a greeting to a user of terminal 110 when he/she logs into virtual wallet application 340. In another implementation, banner 630 may include a warning indicating that only authorized users may access information stored in the user's virtual wallet account.

Listings 640 may include information related to virtual wallet information 405-470 as discussed in connection with FIG. 4. Listings 640 may include links that a user can select using a pointing device, such as a mouse, pen-based pointing device, etc. A selected link may open another user interface or window that can provide the user with additional information about virtual wallet information 405-470 related to the link. For example, selecting identification information 405 may open a browser window that allows the user to select, enter, or download identification information into a user account, such as a virtual wallet account related to a user of terminal 110.

Figure 7:
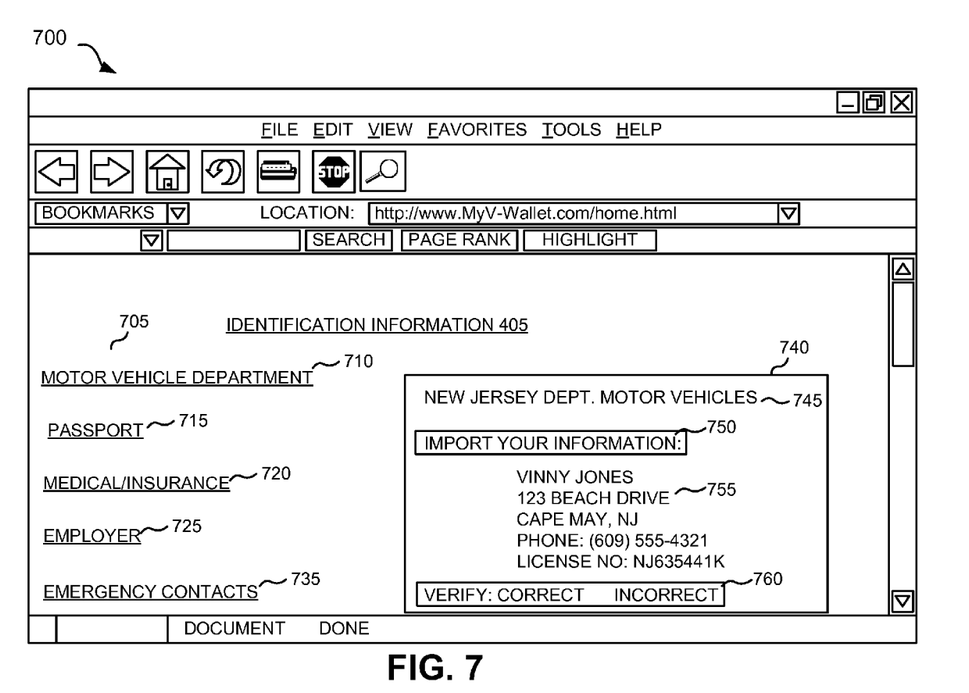
FIG. 7 illustrates an exemplary user interface to download information into a user account.

FIG. 7 illustrates an exemplary user interface 700 to download information into a user account, such as a virtual wallet account, maintained on server 130. Interface 700 may include identification information 405, topics 705, and window 740. Topics 705 may include information that identifies fields, links, headings, topics, or other information that allows a user to enter information into interface 700. For example, topics 705 may include department of motor vehicles 710, passport 715, medical/insurance 720, employer 725, and emergency contacts 735. Other implementations of interface 700 may include more or fewer topics 705. Department of motor vehicles 710 may include information that allows a user access his/her department of motor vehicles related information, such as a driver's license number, department of transportation certification information (such as certifications related to handling hazardous materials), vehicle registrations, etc. In one implementation department of motor vehicles 710 may open a window 740 when selected via a user.

Passport 715 may include information related to a user's passport. For example, selecting passport 715 may display a user's passport picture, the user's name, country of citizenship, and a list of countries recently visited by the user. Medical/insurance 720 may include information that identifies a health care provider, health insurance provider, etc., for a user of terminal 110. Employer 725 may include information that identifies an employer of a user of terminal 110. Emergency contacts 735 may include information that identifies one or more people to contact in case of an emergency involving a user of terminal 110.

Window 740 may include information related to topics 705. For example, window 740 may open when a user selects department of motor vehicles 710. Window 740 may allow the user to access, enter, or upload/download his/her identification information as the information relates to a department of motor vehicles (e.g., a state department of motor vehicles). In one implementation, window 740 may include department name 745, import information button 750, user information 755, and a verify button 760.

Department name 745 may include information about a department of motor vehicles that is providing the user information. Import information button 750 may include code that causes interface 700 to access a destination, such as a web site operated by the department of motor vehicles identified by department name 745. For example, interface 700 may access the web site and may download information related to Vinny Jones. In one implementation, the user may be allowed to access the department of motor vehicles site when he/she is validated by server 130 to access his/her virtual wallet account on server 130.

User information 755 may include information maintained on behalf of a user by a department of motor vehicles identified by department name 745. Verify button 760 may include information or code that allows a user to verify that his/her information downloaded from the department of motor vehicles is correct. For example, selecting "correct" for verify button 760 may store user information 755 on server 130 in virtual wallet information 357 (e.g., identification information 405) and selecting "incorrect" may send the user to a customer support representative at the department of motor vehicles so that the incorrect information can be corrected before the information is downloaded to server 130.

Figure 8:
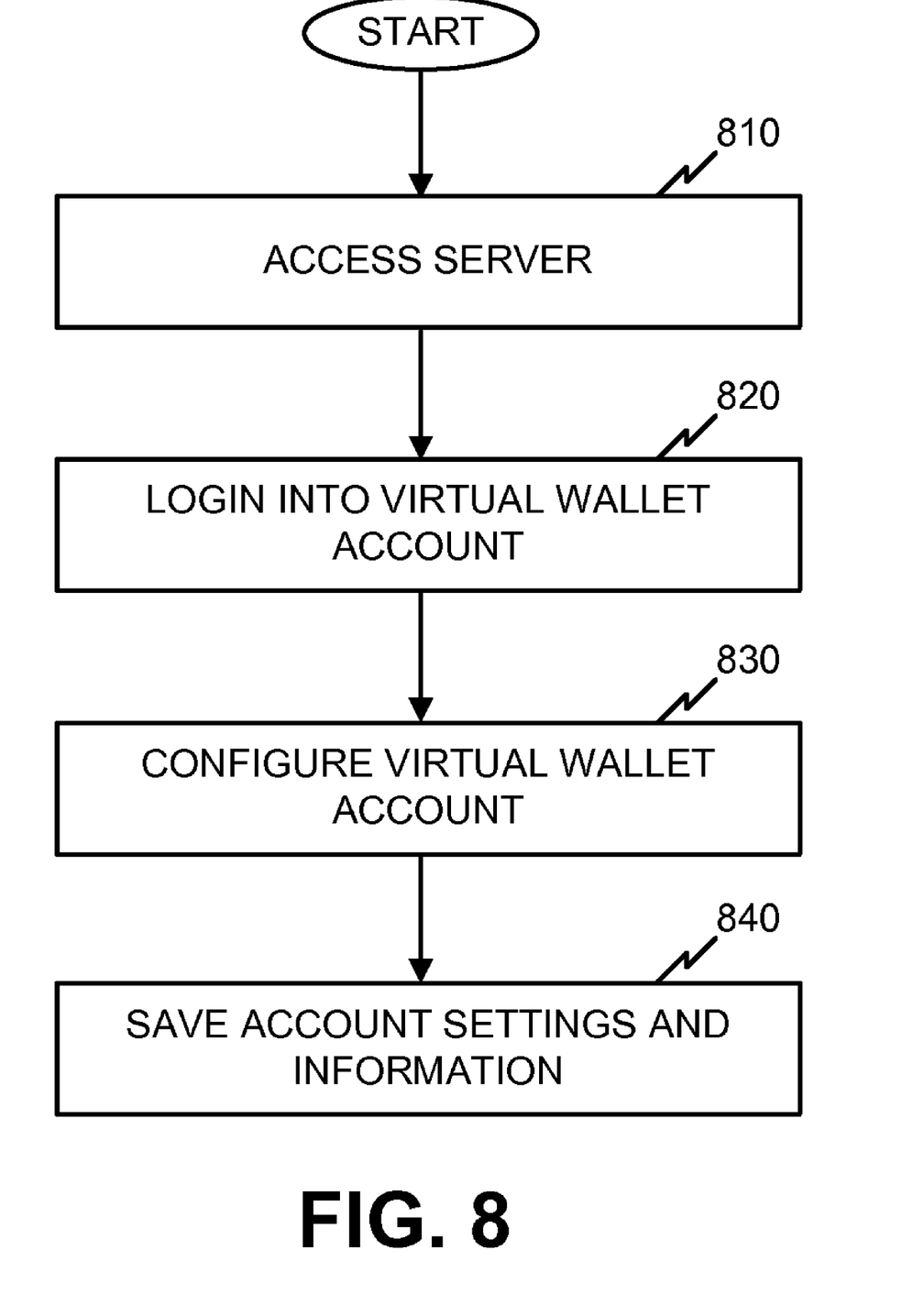
FIG. 8 illustrates an exemplary process for creating an account on the server of FIG. 1.

FIG. 8 illustrates an exemplary process for creating an account on server 130. A user of terminal 110 may decide to establish a virtual wallet account on server 130 so that the user can store commonly used information on his/her terminal 110. For example, a user may wish to store his/her driver's license information and credit card information on terminal 110 so that the user can rent cars without having his/her conventional wallet on his/her person at the time of rental. The user may further wish to have his/her driver's license information and/or credit card information stored in a virtual wallet account on server 130.

The user may access server 130 using user terminal 150 and/or terminal 110 (block 810). In one implementation, the user may enter identifying information and may select a user name and password for use with virtual wallet application 340. Virtual wallet application 340 may establish a virtual wallet account on behalf of the user when the user's identity is valid.

The user may log into his/her virtual wallet account when the account is created on server 130 using virtual wallet application 340 (block 820). In one implementation, a user may access interface 600 by typing a universal resource locator (URL) into a web browser application on user terminal 150. The user may be provided with interface 600 where the user may enter his/her username and password into login window 620. The user may be presented with banner 630 and listings 640 when the user is validated via security module 330.

The user may configure his/her virtual wallet account on server 130 (block 830). In one implementation, the user may arrange how listings 640 and/or topics 705 are displayed in interfaces 600 and 700, respectively. In another implementation, the user may determine what information is stored on server 130 and what information is stored on terminal 110. In still other implementations, the user may make other types of selections with respect to interface 600 or 700 and/or virtual wallet application 340. The user may store information for his/her virtual wallet account on server 130, terminal 110 and/or user terminal 150. For example, the user may store images under images 445 in listings 640 (interface 600, FIG. 6), preferred menus under ordering information 425 in listings 640, bank account information under account information 435 in listings 640, etc.

The user may save his/her virtual wallet account settings and information when he/she is finished configuring the virtual wallet account (block 840).

Figure 9:
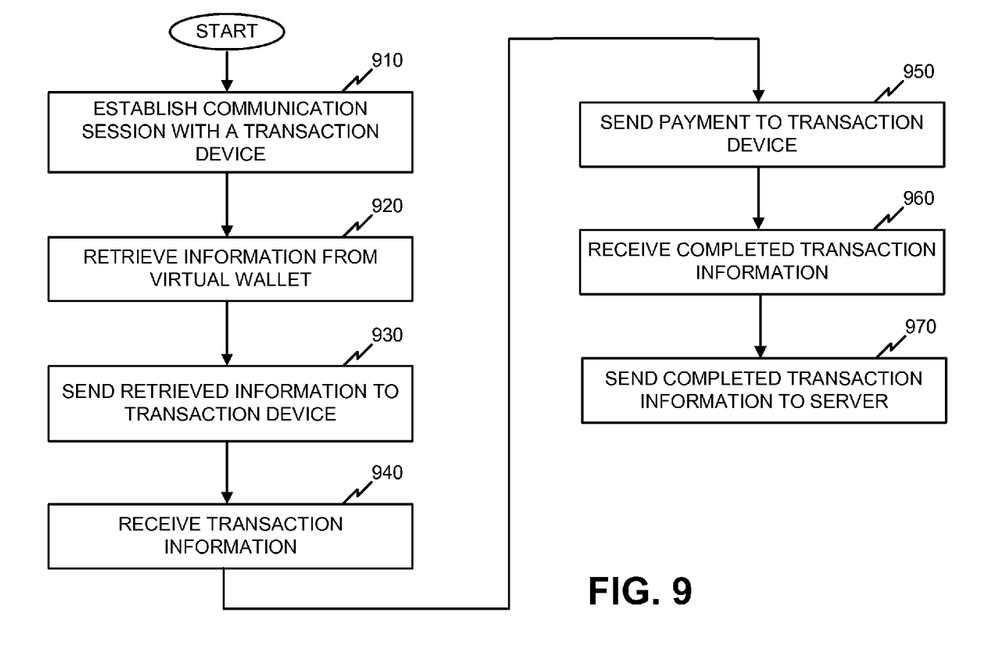
FIG. 9 illustrates exemplary processing for a transaction that uses information retrieved from a virtual wallet.

FIG. 9 illustrates exemplary processing for a transaction that uses information related to virtual wallet application 340. Terminal 110 may establish a communication session with transaction device 140 (block 910). In one implementation, terminal 110 may receive an RFID query from transaction device 140 to initiate a session. Terminal 110 may reply to the query by sending authentication information, such as a token, a PIN, etc., to transaction device 140. For example, terminal 110 may send an ESN, a secure ID token, and a PIN to transaction device 140. Terminal 110 and transaction device 140 may communicate via a secure near field communication session or via a secure far field communication session when terminal 110 is identified as a valid terminal. In another implementation, transaction device 140 may open a secure tunnel from mobile terminal 110 to server 130 to allow secure information exchanges therebetween. Terminal 110 may provide information received via the tunnel to transaction device 140.

Terminal 110 may retrieve information from wallet storage 525 via mobile application 550 (block 920). For example, a user of terminal 110 may arrive at a fast food restaurant and may wish to order food using his/her preferred menu. The user may instruct terminal 110 to retrieve the preferred menu from storage 520 (e.g., mobile storage 525) or from storage module 350 (FIG. 3) on server 130 (e.g., virtual wallet information 357). Terminal 110 may display the preferred menu on a display of terminal 110 so the user can make changes to the preferred menu when desired.

Terminal 110 may send retrieved information (preferred menu) to transaction device 140 via a secure near field communication link (block 930). Transaction device 140 may process the preferred menu and may identify items that the user wishes to order. Transaction device 140 may prepare a message that includes transaction information about ordered items, such as item names, quantities of items, costs for items and a total cost for the order.

As another example of the operations associated with blocks 920 and 930, consider the situation in which a user would like to use terminal 110 as a virtual driver's license. In this situation, the user may retrieve a pointer to a location such as a web site or other network server associated with the department of motor vehicles (DMV). The pointer may enable the receiver to verify information, such as the user's age, with the DMV.

Terminal 110 may receive the transaction information via the secure near field communication link (block 940). Terminal 110 may display the transaction information to the user via a display on terminal 110 so that the user can confirm that the proper type and number of items are going to be ordered. Terminal 110 may also prepare payment information so that a payment can be sent to transaction device 140 for the ordered items. In one implementation, terminal 110 may retrieve a credit card number and expiration date from credit/debit cards 415 (FIG. 4) by contacting server 130 during the transaction. Alternatively, terminal 110 may store a local copy of credit/debit cards 415 in mobile storage 525. Terminal 110 may retrieve a credit card number via mobile wallet 550.

Terminal 110 may send payment to the transaction device (block 950). For example, terminal 110 may send the credit card number and expiration date to transaction device 140 along with an authorized amount to charge to the credit card. In one implementation, terminal 110 may send a copy of the charge authorization information to server 130 and/or to a server operated by the credit card issuer so that server 130 and/or the credit card issuer are aware that a charge will be made to the user's card on behalf of the fast food restaurant.

Transaction device 140 may process the order placed by terminal 110 and may charge the identified credit card to cover the costs of ordered items. Transaction device 140 may generate completed transaction information once the credit card charge is approved by the credit card issuer. Transaction device 140 may send the completed transaction information to terminal 110 and/or to another device, such as server 130.

Terminal 110 may receive completed transaction information via the secure near field communication link (block 960). Terminal 110 may process the competed transaction information and may store the completed transaction information in mobile storage 525. For example, terminal 110 may store completed transaction information in a receipts 420 portion of mobile storage 525.

Terminal 110 may send completed transaction information to server 130 (block 970). Server 130 may store competed transaction information in a virtual wallet account related to terminal 110. For example, server 130 may store changes in the preferred menu (if any) in ordering information 425, a receipt for the transaction in receipts 420, information regarding charges to the credit card in credit/debit cards 415 and any coupons received from the fast food restaurant in coupons 470. Server 130 may notify terminal 110 that an account related thereto has been updated using the completed transaction information.

A user of terminal 110 may access the completed transaction information on server 130 by logging into the user's virtual wallet account via user terminal 150 and/or terminal 110. The user may review, modify, copy, print, send, etc., information related to the fast food restaurant transaction using terminal 110 or user terminal 150.

CONCLUSION

Implementations may allow a user to configure a virtual wallet on a mobile terminal or on a server that is linked to the mobile terminal. The virtual wallet may be configured to store information on behalf of a user of the terminal, such as driver's license information, bank account information, access information, contacts, call logs, music files, images, etc. The virtual wallet may include information that can be retrieved by the terminal to perform transactions with other devices, such as a cash register operated by a merchant.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than a restrictive sense.

For example, implementations can be implemented using devices and configurations other than those illustrated in the figures and described in the specification without departing from the spirit of the invention. Devices and/or components may be added and/or removed from the implementations of FIGS. 1-5 depending on specific deployments and/or applications. Further, disclosed implementations may not be limited to any specific combination of hardware, software and/or firmware. In addition, while a series of acts has been described with respect to FIGS. 8-9 the order of acts in FIGS. 8-9 may be varied in other implementations. Moreover, non-dependent acts may be implemented in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A server, comprising:
 a memory to store instructions; and
 a processor to execute the instructions to implement:
  first logic to:
   receive authentication information from a user terminal on behalf of a user,
   receive user information, on behalf of the user, from a first browser application operating on the user terminal, when the user terminal is authenticated via the authentication information,
   send a portion of the user information to a mobile wallet application operating on a mobile terminal of the user, via a second browser application operating on the mobile terminal, and
   receive updated user information from the mobile terminal, where the updated user information identifies a change to the portion of the user information, the change based on an operation performed via the mobile terminal on behalf of the user; and
  second logic to:
   store the user information in a server virtual wallet application on behalf of the user,
   retrieve the portion of the user information from the server virtual wallet application, and
   store the updated user information in the server virtual wallet application.

2. The server of claim 1, where the user information comprises:
 at least one of a name, an address, a phone number, an electronic serial number, a social security number, a driver's license number, passport information, access information, credit card information, debit card information, a receipt, order information, account information, an image, a music file, a contact, a data file, a document, a spreadsheet, a call log, secure personal identification number (PIN) pad logic, or a coupon.

3. The server of claim 1, where the mobile terminal, the user, or the user terminal subscribe to a service provided by the server.

4. The server of claim 1, where the second logic is further to:
 store transaction information comprising one or more of transaction identifying information, merchant information, purchase information, or location information.

5. A mobile terminal, comprising:
 first logic to:
  send identifying information, via a browser application operating on the mobile terminal, to a virtual wallet application running on a server to identify the mobile terminal,
  receive user information, via the browser application, from the virtual wallet application, the user information identified using the identifying information,
  send transaction information to a transaction device to facilitate a transaction on behalf of the mobile terminal, where the transaction information includes a portion of the user information, and
  send completed transaction information related to the transaction to the virtual wallet application; and
 second logic to:
  retrieve the identifying information from a mobile virtual wallet,
  process the user information to produce the transaction information, and
  store the completed transaction information using the mobile virtual wallet.

6. The mobile terminal of claim 5, where the second logic is to:
 process the completed transaction information, the processing making the completed transaction information compatible with the virtual wallet application.

7. The mobile terminal of claim 5, where the user information comprises:
 one or more of a name, an address, a phone number, an electronic serial number, a social security number, a driver's license number, passport information, access information, credit card information, debit card information, a receipt, order information, account information, an image, a music file, a contact, a data file, a document, a spreadsheet, a call log, secure personal identification number (PIN) pad logic, a coupon, student ID, or employee ID.

8. The mobile terminal of claim 7, where the mobile virtual wallet is to:
store at least a portion of the user information in a structured arrangement.

9. The mobile terminal of claim 5, where the first logic is to:
send the identifying information to the server via a far field communication link, and
send the transaction information to the transaction device via a near field wireless communication link.

10. The mobile terminal of claim 5, where the second logic is to:
store updated user information received from a user of the mobile terminal, and
retrieve a portion of the updated user information using the mobile virtual wallet; and
wherein the first logic is configured to:
send the portion of the updated user information to the virtual wallet application.

11. A method, comprising:
verifying an identity of a user terminal;
receiving user information from the user terminal on behalf of a user when the user terminal is verified,
the user information being received from a first browser application operating on behalf of the user terminal;
storing the user information in a structured arrangement using a virtual wallet application operated on behalf of the user;
sending a portion of the user information to a virtual wallet operating on a mobile terminal of the user,
the portion of the user information being sent to a second browser application operating on behalf of the mobile terminal;
receiving updated information from the mobile terminal, the updated information to update at least a portion of the user information, where the updated information is received on behalf of the user from the virtual wallet; and
providing the updated information to the user terminal, the mobile terminal, or another device identified with the user, when the user terminal, the mobile terminal, or the another device are identified as being related to the user.

12. The method of claim 11, where the receiving the user information or the receiving the updated information comprises:
receiving a name, an address, a phone number, an electronic serial number, a social security number, a driver's license number, passport information, access information, credit card information, debit card information, a receipt, order information, account information, an image, a music file, a contact, a data file, a document, a spreadsheet, a call log, secure personal identification number (PIN) pad logic, a coupon, student ID, or employee ID.

13. The method of claim 11, further comprising:
receiving transaction information from a transaction device participating in a transaction with the mobile terminal; and
updating the user information based on the transaction information.

14. The method of claim 11, further comprising:
contacting a destination on behalf of the user;
identifying the user to the destination;
downloading information from the destination on behalf of the user; and
updating the user information with the information; and
storing the updated user information using the virtual wallet application.

15. The method of claim 11, further comprising:
registering the user, the user terminal, or the mobile terminal with a managed service related to the virtual wallet application; and
invoicing the user for the managed service.

16. The method of claim 11, further comprising:
configuring the virtual wallet based on instructions received from the user terminal.

17. A computer readable medium that stores instructions executable by a processing device, the computer readable medium comprising:
instructions for validating an identity of a device, the device validated on behalf of a user;
instructions for configuring a virtual wallet application on behalf of the user, the virtual wallet application to store user information on behalf of the user;
instructions for receiving the user information from the device on behalf of the user, the user information being received by a first browser application operating on the device;
instructions for sending a portion of the user information to a virtual wallet on a mobile terminal operating on behalf of the user, the portion of the user information being sent to a second browser application operating on the mobile terminal;
instructions for receiving updated user information from the mobile terminal, a user terminal, a server, or another device on behalf of the user; and
instructions for storing the updated user information on behalf of the user using the virtual wallet application.

18. The computer readable medium of claim 17, further comprising:
instructions to receive transaction information from a transactions device; and
instructions to update the user information based on the transaction information.

19. The computer readable medium of claim 17, further comprising:
instructions to operate a managed service on behalf of the user and a plurality of other users, the managed service providing, on a subscription basis, the virtual wallet to the user and the plurality of other users, and storage of the user information via the virtual wallet application.

20. The computer readable medium of claim 17, where the instructions for receiving updated user information comprise instructions for receiving updated user information related to at least one of a name, an address, a phone number, an electronic serial number, a social security number, a driver's license number, passport information, access information, credit card information, debit card information, a receipt, order information, account information, an image, a music file, a contact, a data file, a document, a spreadsheet, a call log, secure personal identification number (PIN) pad logic, or a coupon.

* * * * *